V. L. EMERSON.
UNIVERSAL JOINT.
APPLICATION FILED JUNE 16, 1913.

1,085,855.  Patented Feb. 3, 1914.

Witnesses
Margaret V. Emerson
Caroline V. Emerson

Inventor
Victor Lee Emerson,

UNITED STATES PATENT OFFICE.

VICTOR LEE EMERSON, OF ALEXANDRIA, VIRGINIA, ASSIGNOR TO ANNETTE E. EMERSON, OF ALEXANDRIA, VIRGINIA.

UNIVERSAL JOINT.

1,085,855.   Specification of Letters Patent.   Patented Feb. 3, 1914.

Application filed June 16, 1913. Serial No. 773,896.

*To all whom it may concern:*

Be it known that I, VICTOR LEE EMERSON, a citizen of the United States, residing at Alexandria, State of Virginia, have invented certain new and useful Improvements in Universal Joints, of which the following is a specification.

My invention relates to that class of machine elements known as "universal joints."

It has for an object the provision of a joint that is extremely simple in comparison with those of the ordinary type and which is extremely strong and compact and easy of manufacture.

Another object is to provide a joint that will retain a lubricant and in which the moving parts are substantially frictionless.

Another object is to provide a joint in which the exterior is smooth and free from projections.

A further object is to provide a joint in which longitudinal adjustment is permitted between the connecting members.

Other advantages will appear as may be brought out in the following description.

Figure 3:
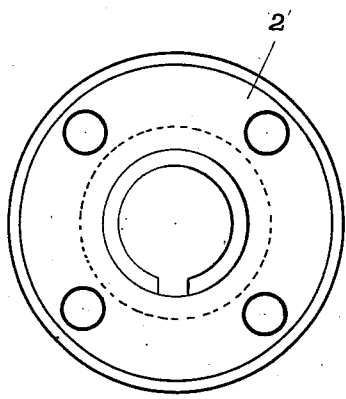
Figure 2:
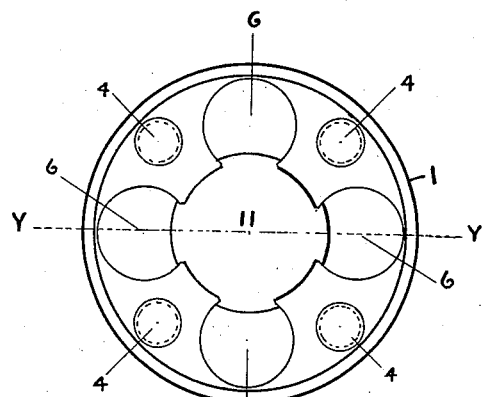
Figure 1:
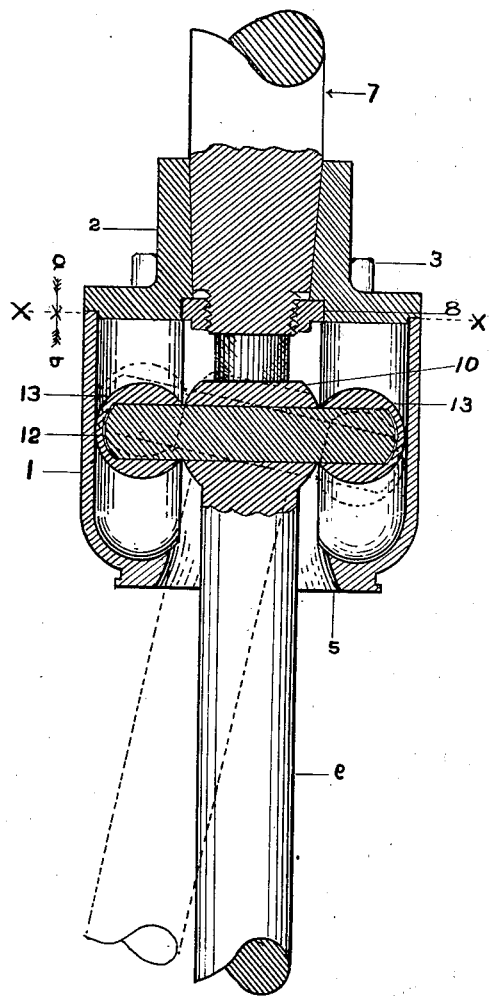

Referring to the accompanying drawings in which like numerals indicate like parts in each of the figures: Figure 1 is a longitudinal section taken on line Y—Y on Fig. 2; Fig. 2 is a section taken on line X—X of Fig. 1, looking in the direction of the arrow *a*; Fig. 3 is a section taken on line X—X of Fig. 1, looking in the direction of arrow *b*.

In the said drawings, 1 represents a cylindrical body which in the embodiment shown is formed of a solid piece of metal and interiorly fluted as shown. At one end of the said body a flanged head 2 is attached by means of bolts 3, which are screwed into threaded bores 4, located in the solid portions of the body 1, as clearly shown in Fig. 2. The other end of the body 1 is provided with a flared opening 5, as shown in Fig. 1. The body 1 is longitudinally bored as shown at 6. In the present instance four of these bores are shown, but their number may be varied at will. The head 2 is centrally bored and has keyed therein a shaft 7, which is held against longitudinal movement by a nut 8.

Entering through the opening 5 is a shaft 9. This shaft is provided with a ball shaped head 10, which is of a diameter less than the central bore or opening 11 in the body. This head 10 carries a spindle 12, which is mounted transversely to the shaft 9 as shown. Upon the ends of said spindle are mounted ball members 13, which are of a less diameter than the bores 6 in the body 1. The ball members 13 are bored to receive the ends of the spindle 12, and are thereby permitted to have longitudinal motion relative thereto. Only one spindle is herein shown, but there may be as many as desired.

It will be noted that as the shaft 9 is moved from the full line position to the dotted line position, as shown in Fig. 1, the ball members 13 slide upon the spindle 12, and thereby automatically compensate for the varying dimensions caused by the structural relationship of the device. It will be noted that the shaft 9, together with the spindle 12 and ball members 13 are permitted to have a longitudinal adjustment within the limits of the bores 6. This adjustment has a great advantage in many uses of a device of this character, and especially when used in connection with the "propeller shaft" of an automobile, as the varying compressions and expansions of the rear springs of the vehicle tend to cause the rear axle to have a longitudinal movement relative to the propeller shaft.

It will be noted that the contacting surfaces of my universal joint have a rolling motion, which reduces the wear and friction to a minimum. The ball shaped head 10 automatically centers shaft 9 and spindle 12, so that the ball members 13 are free to perform their function. This automatic centering occurs twice at each revolution of the joint when the head 10 comes in contact with the ball members 13. It will be noted that the ball members 13 will prevent the head 10 from coming into contact with the surfaces of the bore or opening 11. The contacting points of the driving and driven members of my joint are, therefore, the pivotal points of the ball members 13 with the bores 6.

The body 1 being of a circular one piece fluted construction is extremely strong and compact and lends itself to ease of manufacture. The body being imperforate throughout its circumference and closed at one end by the head 2 and formed with an opening of the character shown at 5, is capable of retaining a lubricant, at all times, which is a desirable feature.

Having described my invention, what I claim is:

1. In a device of the class described, in combination, a rotatable body, said body having a plurality of bores parallel to the axis of rotation thereof and a central opening intersecting said parallel bores, a rotatable member extending freely within said central opening and having a projecting member thereon extending into a plurality of said parallel bores through their intersection with said central opening, ball-shaped members rotatably and slidably mounted on said projecting member, and having a rolling contact with said bores, said ball-shaped members and bores being so formed with respect to each other that said ball-shaped members are held in said bores and constrained at their pivotal points of contact therewith to travel in lines parallel to the axis of rotation of said body, whereby said rotatable member has a rolling connection with said body and partakes of its rotation at varying angles to the axis of rotation thereof.

2. In a device of the class described, in combination, a rotatable body, said body having a plurality of pairs of oppositely disposed bores parallel to the axis of rotation thereof and symmetrically disposed around said axis, and a central opening intersecting said parallel bores, a rotatable member extending freely within said central opening and adapted to partake of the rotation of said body at varying angles to the axis of rotation thereof, said rotatable member having a projecting member thereon extending into a selected pair of said parallel bores through their intersection with said central opening, ball-shaped members rotatably and slidably mounted on said projecting member and having a rolling contact with said bores, said ball-shaped members and bores being so formed with respect to each other that said ball-shaped members are held in said bores and constrained at their pivotal points of contact therewith to travel in lines parallel to the axis of rotation of said body, whereby said rotatable member has a rolling connection with said body.

3. In a device of the class described, in combination, a rotatable body, said body having a plurality of bores parallel to the axis of rotation thereof and a central opening intersecting said parallel bores, a rotatable member extending freely within said central opening, a head on said rotatable member having a projecting member extending into a plurality of said parallel bores through their intersection with said central opening, ball-shaped members rotatably and slidably mounted on said projecting member and having a rolling contact with said parallel bores, said ball-shaped members and bores being so formed with respect to each other that said ball-shaped members are held in said bores and constrained at their pivotal points of contact therewith to travel in lines parallel to the axis of rotation of said body, said head and ball-shaped members being so formed with respect to each other as to automatically center said head, whereby said rotatable member has a rolling connection with said body and partakes of the rotation thereof at varying angles to the axis of rotation of said body.

In testimony whereof I affix my signature in presence of two witnesses.

VICTOR LEE EMERSON.

Witnesses:
 RUTH H. PRETTYMAN,
 GLADYS M. BROOKE.